July 9, 1935.  D. E. LEWELLEN ET AL  2,007,401
BELT SPLICER
Filed Feb. 17, 1934   2 Sheets-Sheet 1
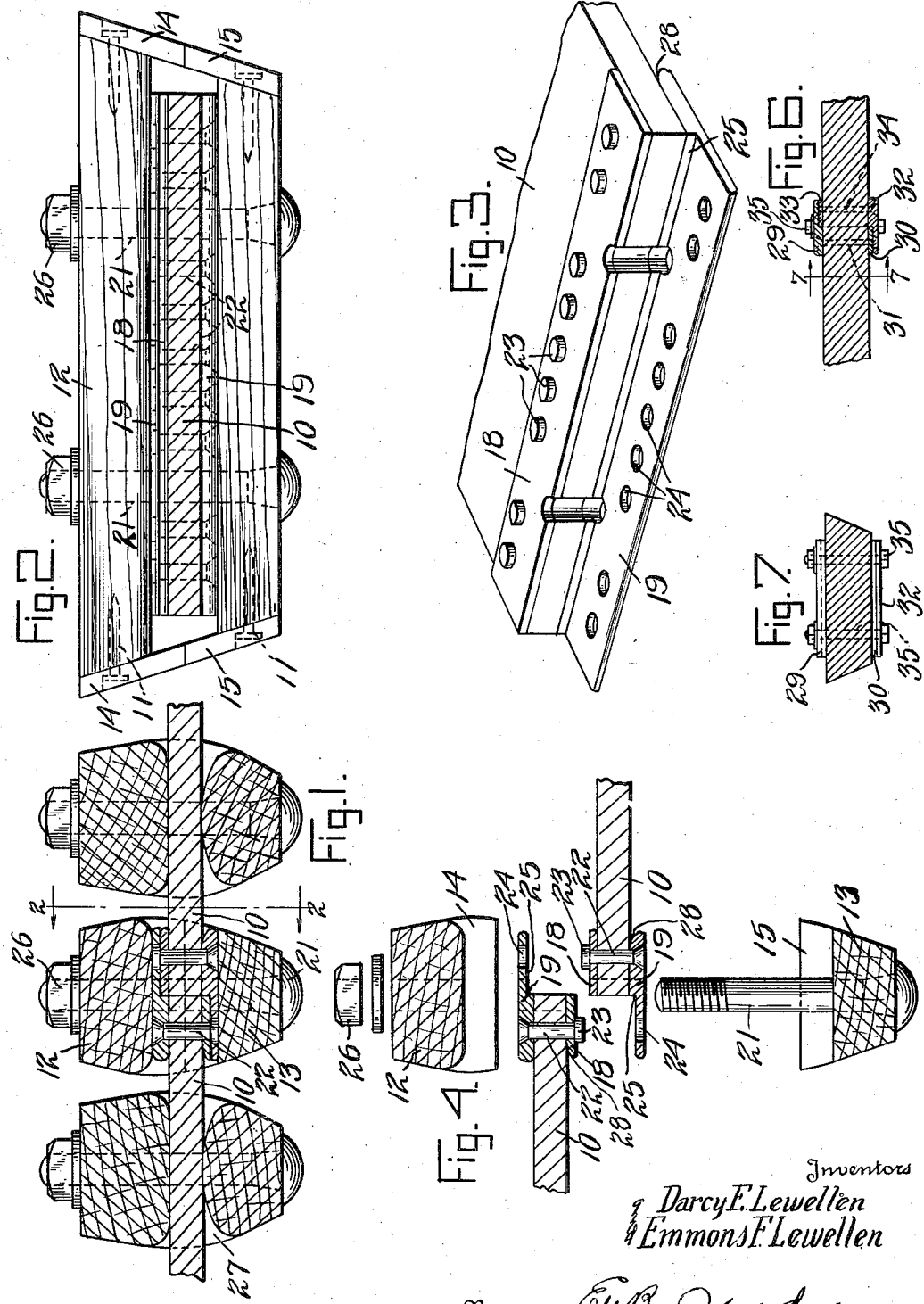
Inventors
Darcy E. Lewellen
Emmons F. Lewellen
By
Attorney July 9, 1935.   D. E. LEWELLEN ET AL   2,007,401
BELT SPLICER
Filed Feb. 17, 1934   2 Sheets-Sheet 2
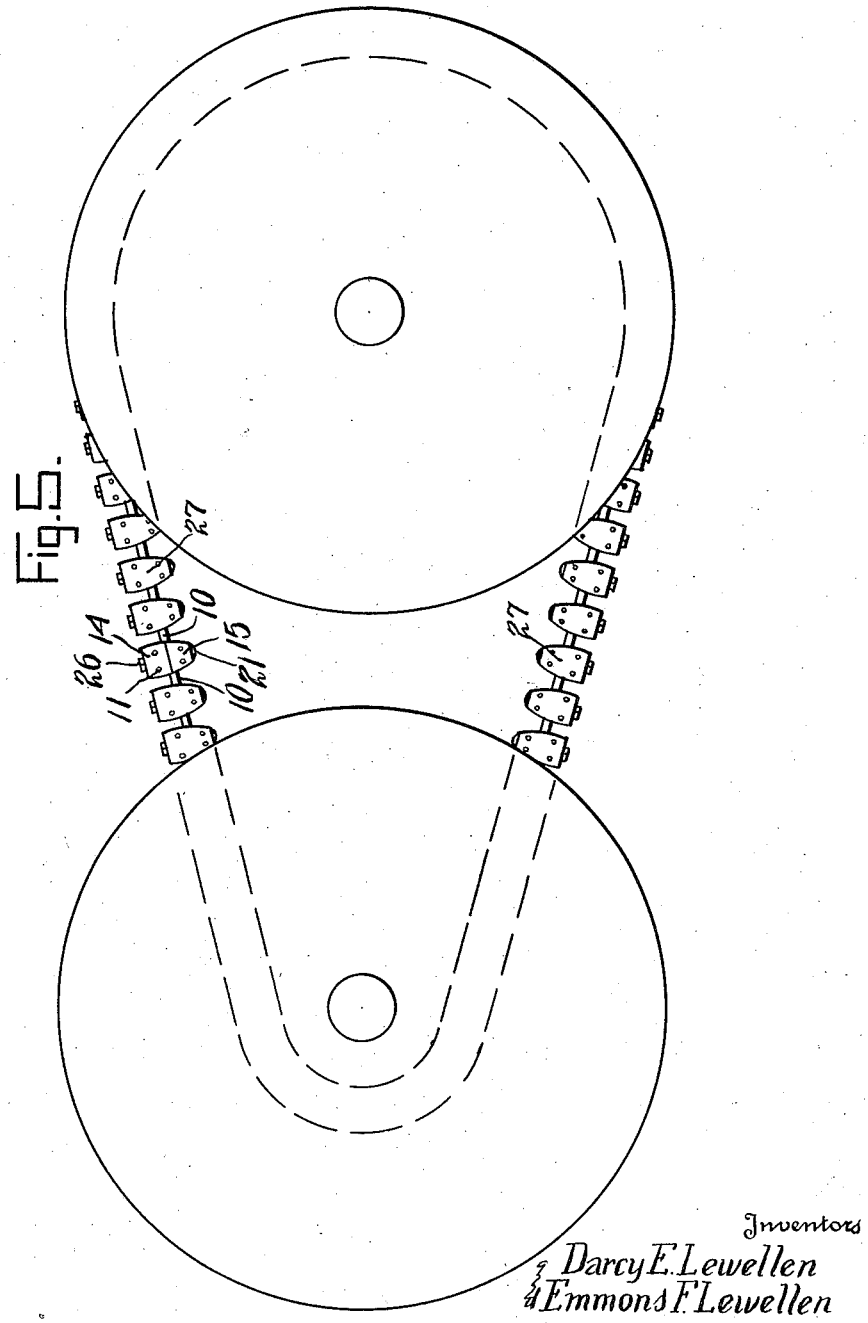
Inventors
Darcy E. Lewellen
Emmons F. Lewellen
Attorney Patented July 9, 1935

2,007,401

UNITED STATES PATENT OFFICE 2,007,401

BELT SPLICER

Darcy Edwin Lewellen and Emmons Freeman Lewellen, Columbus, Ind.

Application February 17, 1934, Serial No. 711,810

10 Claims. (Cl. 24—37)

Our invention relates to belt splicers or fasteners and is designed particularly for use in securing the ends of power belts of the type having a series of transverse blocks thereon with friction pads on the ends of the blocks or belts of the type having edges which frictionally engage with driving or driven pulleys.

An object of the invention is to provide a belt fastening which may be readily manipulated in positions which are difficult of access.

A further object is to provide a splice of light construction and one which will provide a strong union to render the belt continuous and which may be applied to the belt while the same is removed from the transmission so that it will be necessary only to clamp the parts together after the belt has been placed in position on the transmission mechanism.

Referring to the accompanying drawings which are made a part hereof and on which similar reference characters indicate similar parts.

Figure 1 is a side elevation of a portion of the belt showing one of the blocks and the splicing elements in section.

Figure 2 is a section on line 2—2 of Figure 1 looking in the direction of the arrows and showing the transverse belt blocks in side elevation.

Figure 3 is a perspective view of one end of the belt and of the plates secured thereto.

Figure 4 is a detail view showing the splicing plates attached to the ends of the belt and showing the transverse blocks and the ends of the belt separated to show the structure more in detail.

Figure 5 is a side elevation of a transmission mechanism to show the manner and ease of securing the ends of the belt together.

Figure 6 is a longitudinal section of a V-type belt showing our invention adapted thereto, and Figure 7 is a section on line 7—7 of Figure 6.

In the drawings numeral 10 indicates the ends of a belt to which transverse blocks 12 and 13 are secured, these blocks preferably being made of hard wood. The blocks are secured by bolts 21 and nuts 26. The ends of the blocks have friction pads 14 and 15 secured thereon in any suitable way as by gluing or by nails 11. Only the blocks 12 and 13 which are positioned at the point of the splice have separate pads 14 and 15, the other blocks have one continuous friction pad 27. Splicing plates 18 and 19 are secured to the ends of the belt. These plates have holes through which bolts 21 pass for securing the blocks 12 and 13 together. The plates 18 and 19 are secured on the ends of the belt by rivets 22. These rivets have heads 23 which extend into holes 24 in the plate 19. When the spliced block is bolted in position these heads preferably engage the sides of the holes 24 in the plate 19 and take a part of the pull on the belt. The bolts 21 which extend through plates 19 also take a part of the belt pull. In some constructions the heads 23 engaging the sides of recesses may be omitted and the bolts 21 made to carry the whole pulling load on the belt. The long plates 19 have recesses 25 into which the short plates 18 fit when the parts are secured together, as shown in Figure 1. One plate 18 is attached to the top side of one end of the belt and the other plate 18 is attached to the bottom side of the opposite end of the belt. Likewise one plate 19 is attached to the top side of one end of the belt while the other plate 19 is attached to the bottom side of the opposite end of the belt. The plates 18 and 19 are preferably of steel or of some other suitable metal.

In applying the belt to the transmission, the complete belt carrying all of the blocks except the splice block as shown in Figure 5, is passed around the transmission shaft between the disks, the ends of the belt being brought together so that the bolts 21 will pass through holes in the plates and in the blocks. The lower block 13, carrying the bolts 21, is then placed in position, the bolts 21 passing through the holes in the plates and in the blocks. The top block 12 is then placed in position on the bolts 21 and nuts 26 secured thereon.

The dimensions of the splice block are approximately the same as the dimensions of the other blocks so that the block has the same flexibility at the splice as at the other parts of the belt. The plates 18 and 19 are rounded off at 28 to permit free bending of the belt body.

From the foregoing description it will be seen that the belt fastener is simple in construction and that the parts may be quickly and easily secured together. Moreover it will be apparent that the ends of the belt may be secured together in a very limited space as it is only necessary to have space enough to insert the blocks 13 and the bolts 21 since the nuts 26 are secured on the bolts at the outside of the belt. The position of the splice shown in Figure 5 will illustrate the ease with which the device may be used.

One important practical advantage of these splicing plates is that they are much lighter than splicing blocks of this general type now in use and are, therefore, particularly adapted for use with belts of the kind shown.

In Figures 6 and 7 the splicing blocks are shown adapted to a different form of belt. Belts generally known as of the V-type have commonly been used heretofore as automobile fan belts. Belts of this type have more recently been made in much larger sizes for transmitting power and have been made in almost any lengths by using a number of belts to form the driving transmission. In some work there are specially molded belts used in which the width is much greater than the thickness. These belts have their frictional engagement with the pulley on the edges of the belts. In Figures 6 and 7 we have shown means for splicing the ends of some of these belts together. As shown in Figure 6 plates 29 are secured by rivets 31 to plates 30 on the opposite side of the belt. Plates 32 are secured by nuts 34 to plates 33 on the opposite side of the belt, the plates 32 being oppositely arranged from the plates 29. Bolts 35 pass through these plates and through the ends of the belt and secure the plates together. This forms a simple, light but effective splice for belts of this type.

It will be obvious to those skilled in the art that various changes may be made in our device without departing from the spirit of the invention and therefore we do not limit ourselves to what is shown in the drawings and described in the specification, but only as indicated by the appended claims.

Having thus fully described our said invention, what we claim as new and desire to secure by Letters Patent, is:

1. In a belt splicer the combination with a belt and a belt block associated therewith of a pair of plates at the meeting ends of the belt, said plates being secured to the ends of the belt and having cooperating elements engageable with each other for taking some of the pull on the belt, and a bolt passing through said plates and through said belt block.

2. The combination with a belt and belt blocks adapted for use in connection with variable speed transmission mechanism of a pair of plates fixed to the belt adjacent the ends thereof, the end of one plate being secured to the end of the belt, the other end of the plate having a cut out portion, the other plate being similarly formed but arranged oppositely to the first plate, short plates secured to the opposite sides of the ends of the belt and engaging the cut-out portion on the other plate, the means for fastening said plates to the belt also engaging the plate on the other end of the belt for sustaining some of the pull on the belt.

3. In a belt splicer the combination with a belt and a belt block associated therewith of a pair of plates secured to the ends of said belt, said plates being secured to the ends of said belt and to the said blocks to permit flexing of the belt at the spliced joint substantially as freely as at other places on the belt.

4. A belt splicer for a belt having a plurality of transverse blocks thereon comprising a pair of plates secured to the ends of the belt, means for securing said plates together and for securing the adjacent transverse block to the belt, said securing means passing through the said plates and through said transverse block.

5. A belt splicer of the kind described comprising a pair of plates, said plates being formed so as to have flat portions lying in two offset parallel planes, means for securing the ends of said plates to adjacent ends on the belt, the offset parallel planes providing recesses oppositely arranged and on opposite sides of the belt, a pair of plates secured on the ends of said belt and adapted to seat in said recesses, the free ends of said prior named plates being perforated to receive the heads of the securing means for the other ends of the plates, and means passing through said plates for securing transverse blocks on said belt.

6. A splicer for a variable speed transmission belt of the kind described comprising a pair of blocks adapted to be secured to said belt at the free ends of the belt, said blocks having friction pads on their opposite ends to provide a friction drive between the belt and the driving means or the driven pulley, long and short plates secured to each end of said belt, the free ends of the long plates having cut out portions adapted to receive a short plate secured on the other end of the belt, rivets securing said plates to the ends of said belt, the heads of said rivets being engageable in sockets in the free end of the opposite long plate to form a driving engagement with the plate.

7. In a belt splicer, the combination with a belt and a belt block associated therewith, of a pair of plate members at the meeting ends of the belt, and means passing through said members and block to transmit the tension of the belt and to hold the members in an assembled relation.

8. The combination with a belt and belt blocks attached for use in connection with variable speed transmission mechanisms, of a pair of members fixed to the belt adjacent the ends thereof and means for securing said members to the belt, said means having projections interlocking with the member secured to the other end of the belt.

9. In a belt splicer the combination with a belt and a belt block associated therewith, of plates adjacent the severed ends of the belt, one of said plates being recessed to fit a plate on the opposite end of the belt, and means for securing said plates to said belt, said means having projections which interlock with openings in the recessed side of said plate.

10. In a belt of the V-type, the combination of splicing plates on the ends of the belt, one of said plates consisting of a flat plate secured to the end of the belt, the other plate having a cut-out portion adapted to receive the first named plate and secured to and on the same side of the belt, corresponding plates being secured in alternate arrangement on the other side of the ends of the belt and fastening means passing through said plates and the ends of said belt to secure said plates to each other and to the belt and to take part of the pull of the belt.

DARCY EDWIN LEWELLEN.
EMMONS FREEMAN LEWELLEN.